United States Patent [19]
Hagemeister et al.

[11] 3,890,780
[45] June 24, 1975

[54] BEARING SUPPORT FOR THERMAL POWER ENGINES

[75] Inventors: Klaus Hagemeister, Munich; Josef Wiesbock, Dachau, both of Germany

[73] Assignee: Motoren-und Turbinen-Union Munich GmbH, Germany

[22] Filed: Aug. 31, 1973

[21] Appl. No.: 393,275

[30] Foreign Application Priority Data
Aug. 31, 1972  Germany............................ 2242734

[52] U.S. Cl. ............... 60/39.08; 184/6.11; 417/408
[51] Int. Cl. ............................................. F02c 7/06
[58] Field of Search.................. 60/39.08; 184/6.11; 417/408

[56] References Cited
UNITED STATES PATENTS

| | | | |
|---|---|---|---|
| 2,996,146 | 8/1961 | Beam et al. ......................... | 184/6.11 |
| 3,017,230 | 1/1962 | Meermans .......................... | 184/6.11 |
| 3,200,753 | 8/1965 | DiStefano et al. .................. | 417/408 |
| 3,266,596 | 8/1966 | Blackhurst et al. ................. | 60/39.08 |
| 3,740,170 | 6/1973 | Miller ................................ | 60/39.08 |

FOREIGN PATENTS OR APPLICATIONS

| | | | |
|---|---|---|---|
| 1,077,007 | 3/1960 | Germany ........................... | 60/39.08 |
| 1,088,769 | 9/1960 | Germany ........................... | 60/39.08 |
| 872,703 | 2/1953 | Germany ........................... | 184/6.11 |
| 342,036 | 12/1959 | Switzerland ....................... | 60/39.08 |
| 736,017 | 8/1955 | United Kingdom................. | 60/39.08 |
| 359,718 | 3/1962 | Switzerland ....................... | 60/39.08 |

*Primary Examiner*—C. J. Husar
*Assistant Examiner*—Warren Olsen
*Attorney, Agent, or Firm*—Craig & Antonelli

[57] ABSTRACT

Apparatus for rotatably supporting a high-speed rotor shaft in a small gas turbine engine which includes a three-point ball bearing engageable with the rotor shaft adjacent the compressor wheel and an inclined ball bearing engageable with the shaft adjacent the turbine wheel. In order to facilitate cooling of lubricant oil supplied to the bearings, a sleeve of relatively small diameter as compared to the engine housing walls is clampingly engaged at the outer bearing races for the two bearings, which sleeve serves to conduct lubricating oil away from the bearings out of contact with the much larger surface hot internal housing walls. In a first embodiment, a one-piece sleeve is connected between the respective bearing races which includes a centrally disposed bottom discharge opening for the passage of lubricant oil. In a second preferred embodiment, two telescopically guided sleeve parts are provided, with one being clamped at one outer bearing race and the other at the other. A coil spring is interposed between the two sleeve parts for resiliently transferring axial forces from the turbine outer bearing race to the compressor outer bearing race.

24 Claims, 2 Drawing Figures

BEARING SUPPORT FOR THERMAL POWER ENGINES

BACKGROUND AND SUMMARY OF THE INVENTION

The present invention relates to a bearing support of the type which in use is strongly thermally stressed from the outside and is designed for a high speed shaft. The present invention more particularly relates to a bearing support for a high-speed rotor - having a double roller bearing - of a thermal power engine, particularly for turbine rotors of small gas turbines.

Known gas turbine engines of small construction are characterized by a simple structural make-up and high rotor speeds. The bearings serving therein for supporting a shaft (rotor shaft connecting the compressor and turbine) must be in precise alignment and must not exceed specific maximum temperatures if they are to have an acceptable service life. The rigidity of the entire machine or engine makes it necessary, however, to maintain the outer housing parts between the bearings supporting the compressor and the bearings supporting turbine parts with each other at as large a diameter as possible, so that a certain heating-up of these parts due to the working process cannot be prevented.

One problem consists in providing the high-speed bearings in such a manner that they will be in very precise alignment at all times. A further problem consists in the necessity that one must make do with a relatively small amount of oil and with an oil cooler that is as small as possible. In this connection, direct installation of the bearings in the housing results in the disadvantage that the cooling and lubricating oil completely moistens the hot housing walls in the surrounding area and is strongly or greatly heated up by the hot housing walls.

It is contemplated by the present invention to provide means for increasing the service life to high-speed bearings of such engines with a small technical expenditure by reducing heat distortion of the lubricating oil to thereby reduce the thermal stress of the oil and the bearing temperature. The arrangement contemplated by the present invention further reduces the technical expenditures required for re-cooling the lubricant oil.

The present invention further contemplates providing that outer rings of a three-point bearing, which is disposed on the compressor side of the rotor shaft and outer rings of an inclined ball bearing disposed on the turbine side of the rotor shaft are firmly clamped in a common receiving sleeve or bushing having a small diameter, and in that the receiving sleeve has a common or joint discharge opening for the lubricant at the underside of the sleeve between the three-point and ball bearing.

This receiving sleeve is spaced inwardly from and is cooler than the surrounding housing walls. This firm or rigid clamping provision within a common receiving sleeve, with the resultant cooler lubricant oil, allows for the reduction of the frictional impact of the outer bearing rings in use as well as for the control or handling of the outer bearing rings prior to the installation or assembly of the bearing.

In veiw of the fact that this receiving sleeve or bushing has a greatly reduced inner surface as compared to the inner housing wall which, because of the distance from the housing wall, can be cooled more readily, the thermal stress of the lubricant is relatively low, and as a result, the bearing temperature may also be kept within justifiable limits, which is beneficial for the useful life and the reliability of both bearings. Furthermore, the unfavorable influence of thermal expansions and distortion, warping or straining of the housing on to the bearing is effectively eliminated.

In a further contemplated preferred embodiment of the present invention, the receiving sleeve or bushing serving for receiving the bearing outer rings is subdivided into two parts, wherein the part on the compressor side receives a three-point bearing, while the part on the turbine side carries or supports an inclined ball bearing. The part on the turbine side is slid, in a precise alignment by means of an axially displaceable fit, into or on the part on the compressor side, while moreover clamped in between both parts is a spring element which so prestresses the outer ring or outer race of the turbine bearing that the axial thrust is transmitted partly over or by way of the turbine bearing directly on to the compressor-side bushing while the three-point bearing is being relieved.

As a result of this last-mentioned arrangement, the useful or service life of the compressor-side bearing is further increased because the turbine-side bearing shares more fully in the axial stress forces; the radial play of the inclined ball bearing is eliminated; and the harmful slip of the bearing outer race is reduced, which in the final analysis will turn out to be beneficial for the useful life of both bearings.

These and further objects, features and advantages of the present invention will become more obvious from the following description when taken in connection with the accompanying drawings which show, for purposes of illustration, several embodiments in accordance with the present invention.

DETAILED DESCRIPTION OF THE DRAWINGS

Figure 1:
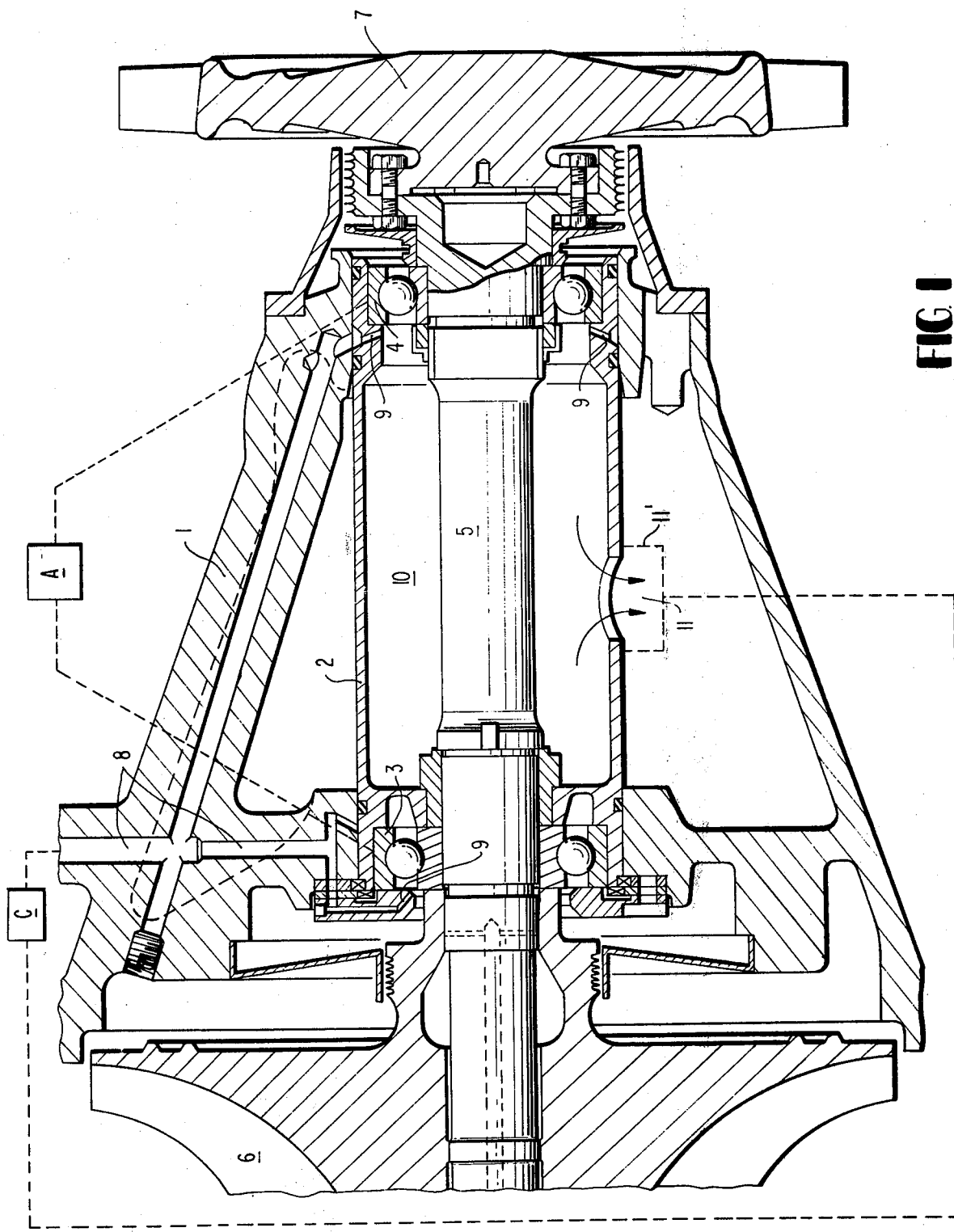
FIG. 1 is a partial cross-sectional view which shows a bearing support constructed in accordance with a first preferred embodiment of the present invention with a one-piece receiving sleeve or bushing.

Referring to FIG. 1, a bearing support is disposed within a turbine housing 1 and contains a receiving sleeve or bushing 2, a compressor bearing 3, a turbine bearing 4, a rotor shaft 5 which carries or supports compressor wheel 6, and turbine wheel 7. The sleeve or bushing is fixed within the housing on the compressor side and, on the turbine side, is installed in a freely axially displaceable manner, thus being adapted to adjusting or setting itself freely with respect to the housing. The feed or supply of cooling and lubricating agent is through feed lines 8 by way of bores and annular ducts as well as injection nozzles 9 facing toward the bearings. The cooling and lubricating oil passes from the bearings into the inside space 10 of the sleeve or bushing, while any flowing off toward the compressor or the turbine is prevented by blocking air whose feed ducts have not been shown. The oil collects at the bottom of the sleeve or bushing 2 and is adapted to flow off downwardly through an opening 11, or it may be returned by way of suitable lines into the oil sump or oil cooler, respectively, without becoming unnecessarily heated up at the housing walls (without contacting the housing walls).

Figure 2:
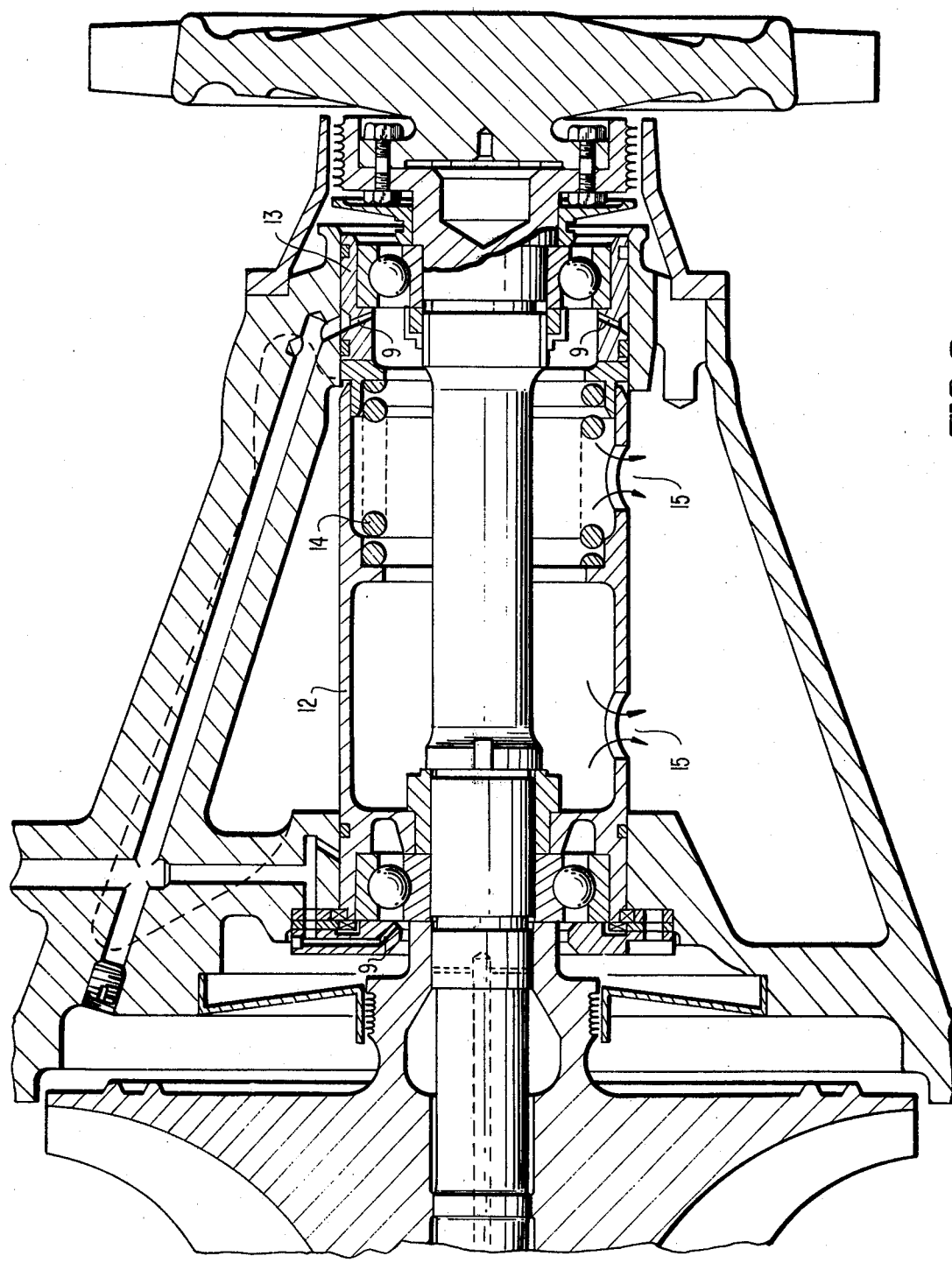
FIG. 2 is a partial cross-sectional view which shows a bearing support constructed in accordance with a second preferred embodiment of the present invention with a bipartite, spring-stressed receiving sleeve or bushing.

FIG. 2 illustrates a bearing support which differs from the FIG. 1 embodiment in that a divided receiving sleeve or bushing is provided instead of the one-piece sleeve 2 of FIG. 1. Compressor-side portion 12 of the receiving sleeve is firmly or rigidly clamped in at the compressor-side end and, at the other end is guided within the housing. The turbine-side part 13 of the receiving sleeve is axially movably installed in the forward part 12 and in the housing by means of sliding fits or seats and is resiliently forced against the compressor-side part 12 by means of a spring 14, with both parts having oil discharge bores 15 at the underside thereof. Each of parts 12 and 13 inwardly directing flange portions which abut respective opposite end parts of spring 14. This construction and embodiment of FIG. 2 otherwise corresponds to that shown in FIG. 1.

In FIG. 1 an oil drainpipe 11' is schematically depicted returning oil to a cooler C in the oil supply circuit. Reference letter A schematically depicts a source of blocking air for the seals. Since the cooler and blocking air supply systems could be constructed by one skilled in the art, given the present disclosure, with known elements, further details thereof are not included herein. Although the FIG. 2 illustration does not include a showing of a feature 11', A and C of FIG. 1, such features could also be used in conjunction with the FIG. 2 arrangement. It is further noted that the inclusion of a cooler in the oil circuit will depend on the specific environment within which the bearing support of the invention is used. If the temperature of the oil is sufficiently lowered by the novel bearing support of the present invention, such a cooler may be dispensed with. In any event, the features of the present invention will reduce the oil cooling requirements.

While we have shown and described several embodiments in accordance with the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim

1. Apparatus for supporting a high-speed rotor shaft comprising:
   first bearing means for directly rotatably suporting said shaft, said first bearing means including a first outer race surrounding roller means of said first bearing means,
   second bearing means for directly rotatably supporting said shaft, said second bearing means including a second outer race surrounding roller means of said second bearing means, said second bearing means being engageable with said shaft at a position spaced axially from said first bearing means,
   a housing subject to substantial heat loads and disposed in surrounding relationship and spaced radially from said shaft and bearing means at least along the length of the shaft between said bearing means,
   lubricant supply means for supplying lubricant to each of said bearing means,
   and receiving sleeve means clampingly engaged with and extending between said first and second outer races, said sleeve means being spaced radially inwardly of internal walls of said housing and including lubricant conducting means for conducting lubricant away from each of said bearing means while maintaining said lubricant out of contact with said internal walls of said housing such that any heating up of the lubricant at said internal walls is prevented.

2. Apparatus according to claim 1, wherein said rotor shaft drivingly interconnects a compressor wheel and a turbine wheel of a gas turbine engine, wherein said first bearing means is a three-point bearing disposed adjacent said compressor wheel, and wherein said second bearing means is an inclined ball bearing disposed adjacent said turbine wheel.

3. Apparatus according to claim 2, wherein said sleeve means includes at least one discharge opening at the bottom thereof for accommodating discharge of the lubricant from said sleeve.

4. Apparatus according to claim 3, wherein said sleeve means is a cylindrical one-piece sleeve which has a continuous diameter along the length thereof, the diameter of said sleeve being greater than the diameter of said outer races by only the thickness of the walls of said sleeve.

5. Apparatus according to claim 4, wherein the outer surface of the respective opposite end portions of said sleeve is slidably clampingly engaged with inwardly facing surfaces of support flanges of said housing.

6. Apparatus according to claim 5, wherein said at least one discharge opening consists of a single discharge opening positioned midway between said first and second bearing means.

7. Apparatus according to claim 5, further comprising cooler means interposed between said discharge opening and lubrication inlets to said bearings for continuously cooling said lubricant during operation of said turbine.

8. Apparatus according to claim 7, wherein said lubricant supply means includes channels through portions of said housing and lubricant nozzles opening into spaces of said bearings which accommodate said roller means.

9. Apparatus according to claim 8, wherein blocking air means are provided for supplying blocking air to preclude passage of said lubricant from said bearings to said compressor and turbine wheels.

10. Apparatus according to claim 2, wherein said sleeve means includes a first sleeve part clampingly engaged with said first outer race and a second sleeve part clampingly engaged with said second outer race, said first and second sleeve parts being axially telescopingly slidable within one another, and wherein spring means are interposed between said first and second sleeve parts to resiliently force said first and second parts away from one another.

11. Apparatus according to claim 10, wherein said sleeve parts are engaged with said outer races such that axial thrust is transmitted partially by way of the second bearing directly on to the first part while relieving the three-point first bearing.

12. Apparatus according to claim 10, wherein said sleeve means includes at least one discharge opening at the bottom thereof for accommodating discharge of the lubricant from said sleeve.

13. Apparatus according to claim 12, wherein said lubricant supply means includes channels through portions of said housing and lubricant nozzles opening into spaces of said bearings which accommodate said roller means.

14. Apparatus according to claim 13, wherein blocking air means are provided for supplying blocking air to preclude passage of said lubricant from said bearings to said compressor and turbine wheels.

15. Apparatus according to claim 12, wherein said at least one discharge opening consists of two separate openings in said first part, said separate openings being disposed on respective opposite axial sides of a radially inwardly directed flange which abuts said spring means.

16. Apparatus according to claim 10, wherein said spring means is a compressed coil spring having opposite ends in abutting engagement with radially inwardly directed flanges at said first and second sleeve parts.

17. Apparatus for supporting a high-speed rotor shaft comprising:
first bearing means for directly rotatably supporting said shaft, said first bearing means including a first outer race surrounding roller means of said first bearing means,
second bearing means for directly rotatably supporting said shaft, said second bearing means including a second outer race surrounding roller means of said second bearing means, said second bearing means being engageable with said shaft at a position spaced axially from said first bearing means,
a housing is surrounding relationship and spaced radially from said shaft and bearing means at least along the length of the shaft between said bearing means,
lubricant supply means for supplying lubricant to each of said bearing means,
and receiving sleeve means clampingly engaged with and extending between said first and second outer races, said sleeve means being spaced radially inwardly of internal walls of said housing and including lubricant conducting means for conducting lubricant away from each of said bearing means while maintaining said lubricant out of contact with said internal walls of said housing such that any heating up of the lubricant at said internal walls is prevented,
wherein the housing is arranged in such a manner that it experiences substantial heat loads sufficient to distort the lubricant supplied to the bearing means,
wherein said sleeve means includes a first sleeve part clampingly engaged with said first outer race and a second sleeve part clampingly engaged with said second outer race, said first and second sleeve parts being axially telescopingly slidable within one another, and wherein spring means are interposed between said first and second sleeve parts to resiliently force said first and second parts away from one another.

18. Apparatus according to claim 10, wherein each of said sleeve parts is engaged with an outer circumference of a corresponding one of said outer races such that axial thrust is transmitted partially by way of the second bearing directly on to the first part while relieving the first bearing.

19. Apparatus according to claim 3, wherein blocking air means are provided for supplying blocking air to preclude passage of said lubricant from said bearings to said compressor and turbine wheels.

20. Apparatus according to claim 17, wherein said sleeve means includes two separate lubricant discharge openings at the bottom thereof in said first part, said separate openings being disposed on respective opposite axial sides of a radially inwardly directed flange which abuts said spring means.

21. Apparatus according to claim 20, wherein said spring means is a compressed coil spring having opposite ends in abutting engagement with radially inwardly directed flanges at said first and second sleeve parts.

22. The apparatus of claim 17, wherein said first sleeve part is located adjacent a turbine wheel located on said shaft and said sleeve part is located adjacent a compressor wheel located on said shaft, wherein said first sleeve part is slid into said second sleeve part in an axially displaceable fit, and wherein said spring means are interposed between both sleeve parts such that axial thrust is transmitted by way of the second bearing directly on to the second sleeve part while the first bearing is being relieved.

23. The apparatus of claim 17, wherein an inner wall of the sleeve means engages each of said outer races in a surrounding relationship.

24. The apparatus of claim 17, wherein the sleeve means has an axial side which is freely axially displaceable such that it is capable of adjusting itself freely with respect to the housing.

* * * * *